US009234778B2

(12) United States Patent
Noishiki et al.

(10) Patent No.: US 9,234,778 B2
(45) Date of Patent: Jan. 12, 2016

(54) OPERATION METHOD OF MULTI-FLOW PASSAGE DEVICE, AND MULTI-FLOW PASSAGE DEVICE

(71) Applicant: Kobe Steel, Ltd., Kobe-shi, Hyogo (JP)

(72) Inventors: Koji Noishiki, Kobe (JP); Akira Matsuoka, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 356 days.

(21) Appl. No.: 13/758,774

(22) Filed: Feb. 4, 2013

(65) Prior Publication Data

US 2014/0102214 A1  Apr. 17, 2014

(30) Foreign Application Priority Data

Mar. 12, 2012  (JP) .................. 2012-054489

(51) Int. Cl.
*G01F 1/74* (2006.01)
*B01L 3/00* (2006.01)
*B01F 5/04* (2006.01)
*B01F 5/06* (2006.01)
*B01F 13/00* (2006.01)
*B01F 15/00* (2006.01)
*B01J 19/00* (2006.01)

(52) U.S. Cl.
CPC .............. *G01F 1/74* (2013.01); *B01F 5/0473* (2013.01); *B01F 5/0647* (2013.01); *B01F 13/0059* (2013.01); *B01F 15/00162* (2013.01); *B01J 19/0093* (2013.01); *B01L 3/5027* (2013.01); *B01J 2219/0086* (2013.01); *B01J 2219/0099* (2013.01); *B01J 2219/00783* (2013.01); *B01J 2219/00891* (2013.01); *B01J 2219/00894* (2013.01); *B01J 2219/00963* (2013.01); *B01L 2200/146* (2013.01); *B01L 2300/0681* (2013.01); *B01L 2300/0816* (2013.01); *B01L 2300/0883* (2013.01)

(58) Field of Classification Search
CPC ............ B01F 13/0059; B01F 15/00162; B01J 19/0093; B01J 2219/00894; B01J 2219/00963; B01L 2200/146; B81B 1/00; G01F 1/74
USPC ....................................... 73/861.42
See application file for complete search history.

(56) References Cited

U.S. PATENT DOCUMENTS

2004/0159351 A1* 8/2004 Znamensky et al. .......... 137/240
2005/0054111 A1* 3/2005 Breimesser et al. ........... 436/43
2005/0226776 A1* 10/2005 Brady et al. ................... 422/99

FOREIGN PATENT DOCUMENTS

| JP | 60-071894     | 4/1985 |
| JP | 2005-517161 A | 6/2005 |
| JP | 2008-168173   | 7/2008 |
| JP | 2008-168173 A | 7/2008 |

* cited by examiner

*Primary Examiner* — Hezron E Williams
*Assistant Examiner* — David Z Huang
(74) *Attorney, Agent, or Firm* — Studebaker & Brackett PC

(57) ABSTRACT

In an operation method of a multi-flow passage device, and a multi-flow passage of the present invention, blockage detection of a reaction flow passage can be readily performed and cleaning of the reaction passage can be easily performed.
The operation method of the multi-flow passage device of the present invention is an operation method of a multi-flow passage device 1 formed with a reaction flow passage 20 for producing a reaction product S by allowing raw material fluids Q, R to flow and making chemical reaction, the method including steps of: partitioning the reaction flow passage 20 into a plurality of sections; and allowing the raw material fluids Q, R to flow in the reaction flow passage 20 and measuring pressure of the raw material fluids Q, R or the reaction product S flowing through the respective sections to determine blockage of the sections based on the pressure loss of the respective sections.

5 Claims, 6 Drawing Sheets

OPERATION METHOD OF MULTI-FLOW PASSAGE DEVICE, AND MULTI-FLOW PASSAGE DEVICE

BACKGROUND OF THE INVENTION

1. Field of the Invention

The present invention relates to an operation method of a multi-flow passage device, and a multi-flow passage device.

2. Description of the Related Art

Conventionally, as a method for manufacturing a desired reaction product by contacting fluid reactants (raw material fluids) and mixing them, a method with the use of a multi-flow passage device referred to as a so-called micro-channel reactor is known.

The micro-channel reactor includes a substrate formed with fine grooves on the surface, and the fine grooves formed on the surface of the substrate act as a reaction flow passage for mixing raw material fluids. In the multi-flow passage device, by passing raw material fluids to be reacted through the reaction flow passage, area of contact between the raw material fluids to be reacted per unit volume is dramatically increased, which results in enhancement of mixing efficiency of the raw material fluids. The micro-channel reactor is used for such an application as manufacturing of chemical compounds or medicines.

For example, Japanese Patent Laid-Open No. 2008-168173 discloses an example of a micro-channel reactor among multi-flow passage devices. The micro-channel reactor includes a first introduction passage for allowing a first reactant (a first raw material fluid) necessary for the reaction to flow in the reactor; and a second introduction passage that joins at the halfway point in the flow direction of the first introduction passage and allows a second reactant (a second raw material fluid) to flow. Then, the first reactant flowing through the first introduction passage and the second reactant flowing through the second introduction passage are brought into a chemical reaction in a confluent passage of the both passages, and the generated reaction product is carried to outside of a reaction flow passage via the first introduction passage.

Meanwhile, the multi-flow passage device having such a structure as the micro-channel reactor may be used as a heat exchanger for heating and cooling a target fluid.

When the first raw material fluid and the second raw material fluid are introduced into the reaction flow passage of the micro-channel reactor as shown in Japanese Patent Laid-Open No. 2008-168173, there is fear that the reaction flow passage may be blocked because it is formed by very fine grooves. Therefore, in the actual circumstances, for example, prior to introducing the first reactant or the second reactant into the reaction flow passage, existence of blockage of the reaction flow passage must be confirmed by purposely passing a fluid for inspection therethrough. If the reaction flow passage is blocked, the substrate constituting the reaction flow passage must be disassembled for cleaning the entire reaction flow passage. That is, in the micro-channel reactor of Japanese Patent Laid-Open No. 2008-168173, the measures for detecting blockage (referred to as blockage detection) and cleaning are not taken in the reaction flow passage, so that blockage detection and cleaning of the reaction flow passage were quite difficult.

The present invention is an invention achieved in consideration of the above problem, and has an object to provide an operation method of a multi-flow passage device, and a multi-flow passage device that are capable of readily performing blockage detection of a reaction flow passage and also capable of easily performing cleaning of the reaction flow passage.

SUMMARY OF THE INVENTION

In order to solve the above problem, an operation method of a multi-flow passage device of the present invention takes the following technical measures.

That is, the operation method of the multi-flow passage device of the present invention is an operation method of a multi-flow passage device formed with a reaction flow passage for producing a reaction product by allowing raw material fluids to flow and making chemical reaction, the method including steps of: partitioning the reaction flow passage into a plurality of sections; and allowing the raw material fluids in the reaction flow passage to flow and measuring pressure of the raw material fluids or the reaction product flowing through the respective sections to determine blockage of the sections based on the pressure loss of the respective sections.

When the section is determined to be blocked from the pressure loss of the respective sections, the section determined to be blocked may be preferably cleaned.

At least one communication flow passage in communication with the reaction flow passage may be preferably provided, and the communication flow passage partitions the reaction flow passage into a plurality of sections at the communicating portion and measures pressure of the raw material fluids or the reaction product at the communicating portion.

The communication flow passage may be preferably also used as a flow passage through which a cleaning liquid is passed when the section of the reaction flow passage is blocked.

The communication flow passage may be preferably also used as a flow passage through which other raw material fluids are passed.

Meanwhile, the multi-flow passage device of the present invention is a multi-flow passage device formed with a reaction flow passage for producing a reaction product by allowing raw material fluids to flow and making chemical reaction, in which the reaction flow passage includes an inflow port through which the raw material fluids flow in and an outflow port through which the reaction product flows out, and between the inflow port and the outflow port of the reaction flow passage, at least one communication flow passage in communication with the reaction flow passage is provided, the communication flow passage partitioning the reaction flow passage into a plurality of sections at the communicating portion and measuring pressure of the raw material fluids or the reaction product at the communicating portion.

According to the operation method of the multi-flow passage device, and the multi-flow passage device of the present invention, blockage detection of a reaction flow passage can be readily performed and cleaning of the reaction passage can be easily performed.

DESCRIPTION OF THE PREFERRED EMBODIMENTS

Hereinafter, a multi-flow passage device of the present invention will be described based on the drawings.

A multi-flow passage device 1 of the present embodiment is a device for obtaining a reaction product S by making chemical reaction of a first raw material fluid Q and a second raw material fluid R, that are different in kind from each other, in the interior, and is referred to as a micro-channel reactor 3.

Firstly, prior to describing the micro-channel reactor 3, a chemical product manufacturing apparatus 2 in which the micro-channel reactor 3 is provided will be described.

Figure 1:
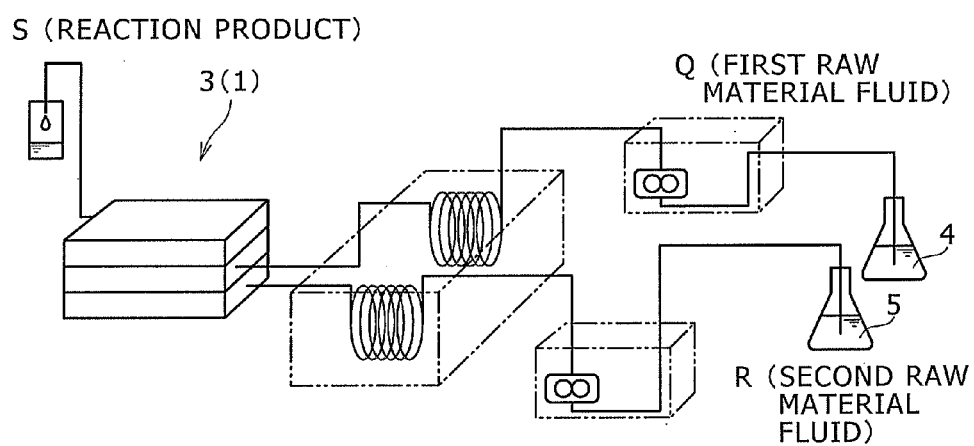
FIG. 1 is a schematic view of a chemical product manufacturing apparatus in which a multi-flow passage device of the present embodiment is provided.

FIG. 1 shows the chemical product manufacturing apparatus 2 in which the micro-channel reactor 3 is provided.

The chemical product manufacturing apparatus 2 includes a first raw material supply part 4 for supplying a first raw material fluid Q (a fluid shown as "Q" in the figure), a second raw material supply part 3 for supplying a second raw material fluid R (a fluid shown as "R" in the figure), and the micro-channel reactor 3 for mixing and reacting the first raw material fluid Q and the second raw material fluid R. In the chemical product manufacturing apparatus 2 of FIG. 1, the first raw material fluid Q and the second raw material fluid R are supplied to the micro-channel reactor 3 via a pump and a temperature controller from each of the first raw material supply part 4 and the second raw material supply part 5.

Figure 2:
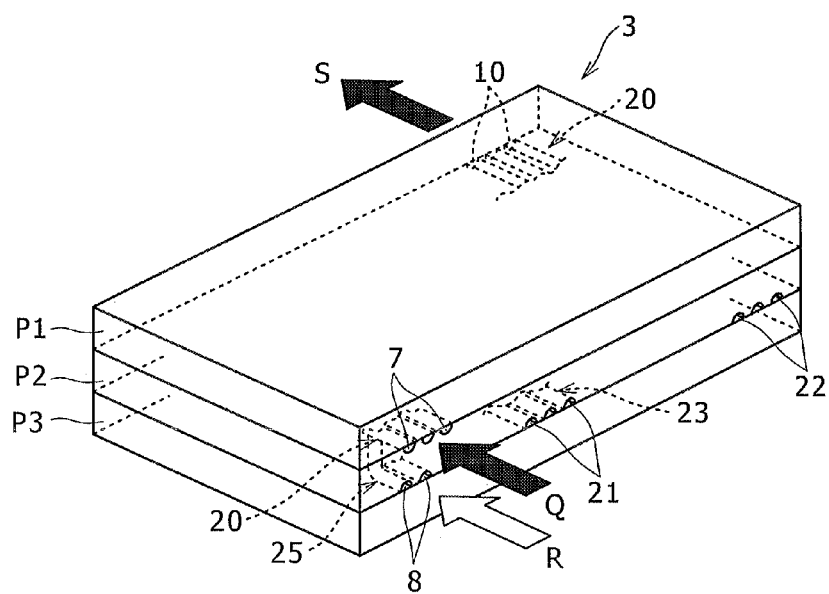
FIG. 2 is a general view of the multi-flow passage device of the present embodiment.

FIG. 2 shows a general view of the micro-channel reactor 3.

As shown in FIG. 2, the micro-channel reactor 3 is a chemical reaction device having the appearance of square shape and used for manufacturing a desired chemical compound or medicine with the use of chemical reactions. The micro-channel reactor 3 (the multi-flow passage device) includes a reaction flow passage 20 for allowing the first raw material fluid Q and the second raw material fluid R described above to flow, and the first raw material fluid Q and the second raw material fluid R flowing through the reaction flow passage 20 cause chemical reaction to generate a reaction product S.

Specifically, the micro-channel reactor 3 is constituted by stacking a plurality of (three (P1-P3) in an example shown in the figure) flow passage plates P1-P3 in a thickness direction, and the reaction flow passage 20 are internally formed by vertically putting the respective flow passage plates P1-P3 on top of one another. In addition, at one side surface of the micro-channel reactor 3 (the side surface facing the near side of FIG. 2; hereinafter, referred to as "the near side"), a first inflow port 7 for supplying the first raw material fluid Q into the micro-channel reactor 3 (the reaction flow passage 20) and a second inflow port 8 for supplying the second raw material fluid R therein are opened. At the near side of the micro-channel reactor 3, a plurality of extraction ports (a first extraction port 21 and a second extraction port 22 in the example shown in the figure) for extracting pressure of the fluids in the reactor (the reaction flow passage 20) are formed with a distance on the side of the second inflow port 8.

In addition, at the other side surface of the micro-channel reactor 3 (the side surface facing the far side of FIG. 2; hereinafter, referred to as "the far side"), an outflow port 10 for discharging the reaction product S generated from the first raw material fluid Q and the second raw material fluid R to the outside of the reactor (the reaction flow passage 20) is opened.

As described above, while the micro-channel reactor 3 is constituted in such a manner that the raw material fluids flow in the reaction flow passage 20 of the micro-channel reactor 3 and that the reaction product S is taken out of the reaction flow passage 20, the inside of the reaction flow passage 20 may be blocked due to various causes. Therefore, in the micro-channel reactor 3 of the present invention, a communication flow passage 23 in communication with the reaction flow passage 20 is provided in the micro-channel reactor 3 for allowing pressure inside the reaction flow passage 20 to be detected, and blockage in the reaction flow passage 20 is quickly detected based on the detected pressure.

Now, the structure of the micro-channel reactor 3 of the present invention will be described by using FIG. 3.

Figure 3:
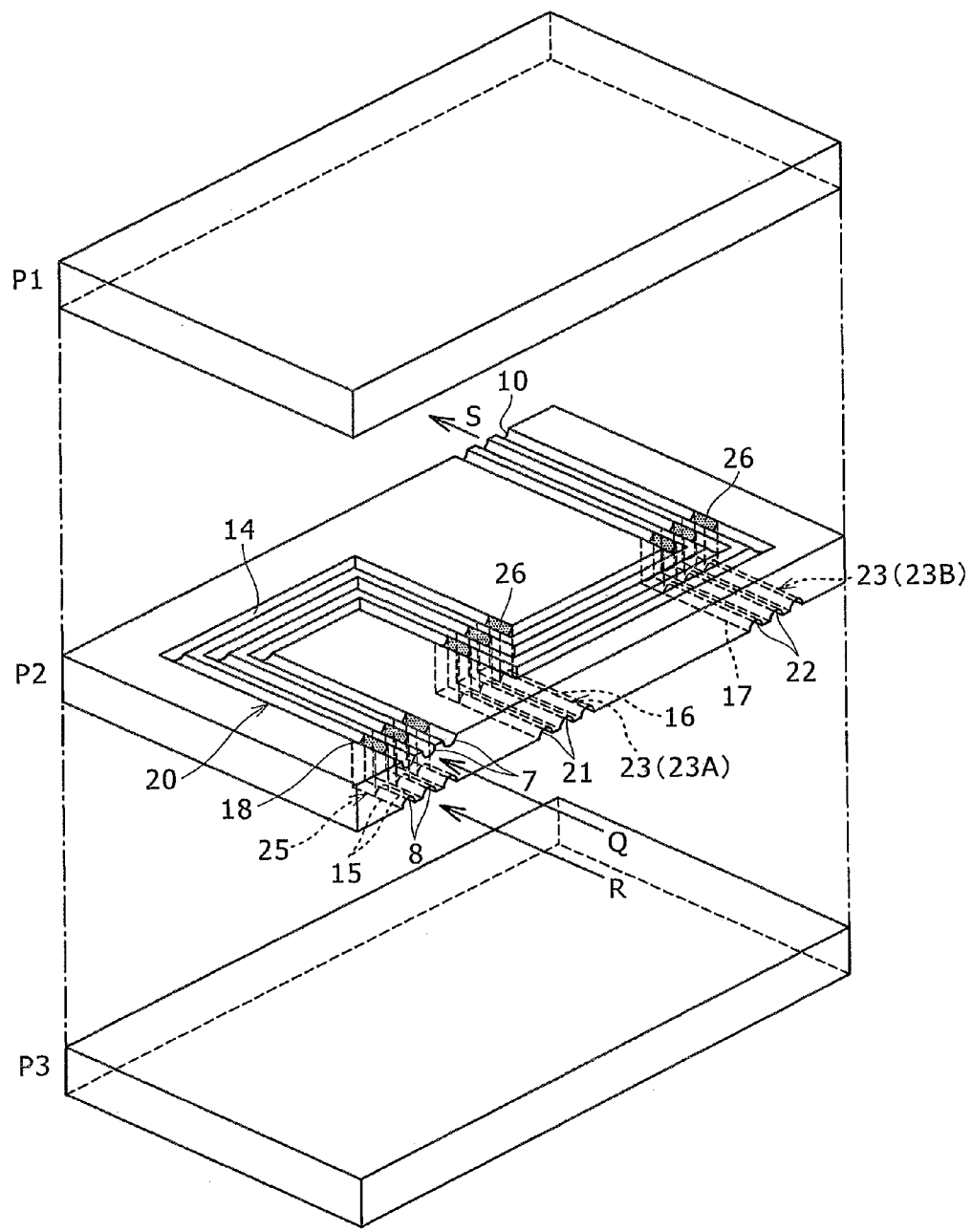
FIG. 3 is an exploded view showing the multi-flow passage device of the present embodiment, as exploded into flow passage plates.

As shown in FIG. 3, the reaction flow passage 20 and the communication flow passage 23 are constituted as follows. Among the flow passage plates P1-P3 constituting the micro-channel reactor 3, on the upper surface (front surface), the lower surface (rear surface) or the like of the flow passage plate P2, fine flow passage grooves (open width of about several μm-several min) having a semicircular cross section are formed by using techniques such as chemical etching, and the flow passage plate P2 is sandwiched between the flow passage plates P1 and P3.

Among three flow passage plates constituting the micro-channel reactor 3, on the upper surface of the middle flow passage plate "P2", a first flow passage groove 14 is formed in a concave shape downwardly. The first flow passage groove 14 extends from the near side end edge of the flow passage plate "P2" toward the center of the plate, and is bent at a right angle in the direction parallel to the longer side of the flow passage plate before reaching the far side end edge. Then, after extending in the direction parallel to the longer side of the flow passage plate, the groove is bent at a right angle toward the near side, and again bent at a right angle in the direction parallel to the longer side of the flow passage plate before reaching the near side end edge. Subsequently, the groove meanders while repeating such a bend at right angles multiple times. Finally, the groove is disposed so as to reach the end edge opposite to the entering side. The entry side of the first flow passage groove 14 is in communication with the first inflow port 7, and the exit side thereof is in communication with the outflow port 10. On the other hand, the flow passage plate "P1" is not formed with a concave groove, and is a flat plate serving as a partition plate. Then, the flow passage plate "P2" and the flow passage plate "P1" are put on top of one another so as to cover the first flow passage groove 14 formed on the upper surface of the flow passage plate "P2", thereby forming the reaction flow passage 20 for allowing the raw material fluids to flow.

In addition, on the lower surface of the flow passage plate "P2", a second flow passage groove 15 starting from the near side end edge same as the first flow passage groove 14 and extending linearly toward the center of the plate is formed in a semicircular shape upwardly. The entry side of the second flow passage groove 15 is connected to a position corresponding to the second inflow port 8 described above. In addition, the second flow passage groove 15 extends a little from the near side end edge toward the center of the plate, and is bent upwardly before reaching the center of the plate. Then, the exit side of the second flow passage groove 15 passes through the inside of "P2", reaches a position (a confluent part 18) intersecting with the first flow passage groove 14, and is in communication with the first flow passage groove 14 (the reaction flow passage 20). On the other hand, the flow passage plate "P3" is not formed with a concave groove, and is a flat plate serving as a partition plate. Then, the flow passage plate "P2" and the flow passage plate "P1" are put on top of one another so as to cover the second flow passage groove 15 formed on the lower surface of the flow passage plate "P2", thereby forming an introduction passage 25 in communication with the first flow passage groove 14 (the reaction flow passage 20) for allowing the second raw material fluid R to flow toward the reaction flow passage 20.

Further, on the lower surface of the flow passage plate "P2", in addition to the second flow passage groove 15 described above, a plurality of flow passage grooves (a third flow passage groove 16 and a fourth flow passage groove 17 in the example shown in the figure) are formed at a predetermined intervals. Specifically, the third flow passage groove 16 and the fourth flow passage groove 17 starting from the near side end edge same as the second flow passage groove 15 and extending linearly toward the center of the plate are formed in a semicircular shape upwardly. The third flow passage groove 16 and the fourth flow passage groove 17 extend a little from the near side end edge toward the center of the plate, and are bent upwardly before reaching the center of the plate.

Then, the exit side of the third flow passage groove 16 passes through the inside of "P2", reaches a position (a communicating portion) 26 intersecting with the first flow passage groove 14, and is in communication with the first flow passage groove 14 (the reaction flow passage 20). Similarly, the fourth flow passage groove 17 passes through the inside of "P2" and reaches a position (a communicating portion) 26 intersecting with the first flow passage groove 14. The position 26 where the fourth flow passage groove 17 intersects with the first flow passage groove 14 is located at the downstream side than the position 26 where the third flow passage groove 16 intersects with the first flow passage groove 14. In addition, the third flow passage groove 16 and the fourth flow passage groove 17 are separated in the width direction (the horizontal direction on a paper of FIG. 3), the entry side of the third flow passage groove 16 is connected to a position corresponding to the first extraction port 21 described above, and the entry side of the fourth flow passage groove 17 is connected to a position corresponding to the second extraction port 22 described above.

Thus, the flow passage plate "P2" and the flow passage plate "P3" are put on top of one another so as to cover the third flow passage groove 16 and the fourth passage groove 17 formed on the lower surface of the flow passage plate "P2", thereby forming the communication flow passage 23 in communication with the reaction flow passage 20 different from the introduction passage 25 described above. That is, in the micro-channel reactor 3, two communication flow passages 23 (a first communication flow passage 23A and a second communication flow passage 23B) branching at the halfway point from the reaction flow passage 20 are formed.

As thus described, in the micro-channel reactor 3 of the present invention, at least more than one communication flow passages 23 (the first communication flow passage 23A and the second communication flow passage 23B in FIG. 3) in communication with the reaction flow passage 20 are provided inside the micro-channel reactor 3, the reaction flow passage 20 is partitioned into a plurality of sections by the communication flow passages 23, and pressure loss of the raw material fluid in each of the partitioned section is viewed by means of the communication flow passages 23, thereby allowing blockage detection of the reaction flow passage 20 to be readily performed.

Figure 4A:
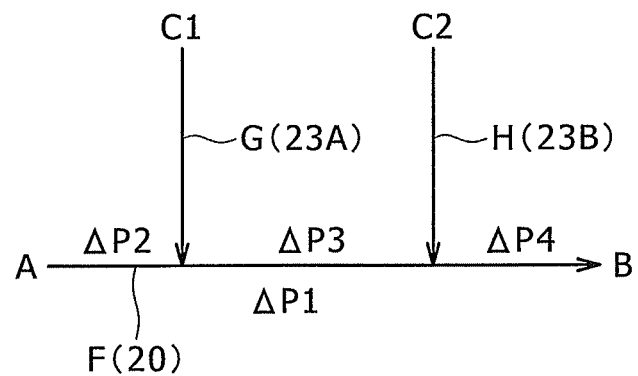
FIGS. 4A and 4B are views showing a relationship between a reaction flow passage and communication flow passages with respect to the multi-flow passage device shown in FIG. 3.
Figure 4B:
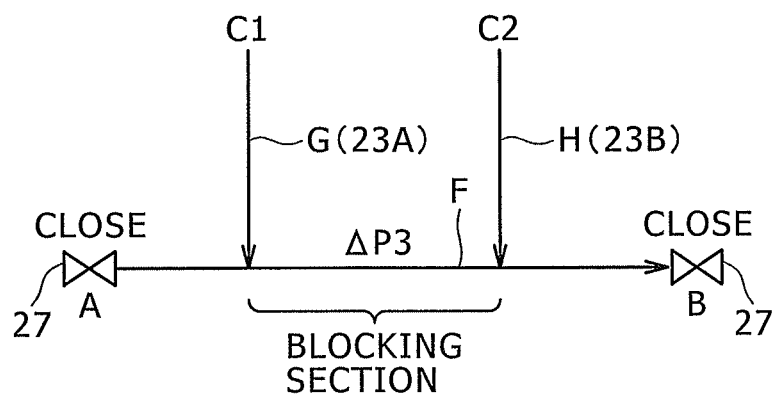

FIGS. 4A and 4B show a relationship between the reaction flow passage 20 and the communication flow passages 23 of the micro-channel reactor 3 shown in FIG. 3. By using FIGS. 4A and 4B, clogging of the reaction flow passage 20 at the time when the raw material fluids are passed will be described together with the pressure loss of the respective sections.

The position A shown in FIGS. 4A and 4B is the confluent part 18 at which the reaction flow passage 20 and the introduction passage for introducing the second raw material fluid R join, and a position B is the outflow port 10 through which the reaction product S flows out. A position C1 is the first extraction port 21 provided in the first communication flow passage 23, and a position C2 is the second extraction port 22 provided in the second communication flow passage 23. A line segment F is the reaction flow passage 20, a line segment G is the first communication flow passage 23A, a line segment H is the second communication flow passage 23B, an intersection of the line segment F and the line segment G is the communicating portion 26 of the first communication flow passage 23A and the reaction flow passage 20, and an intersection of the line segment F and the line segment H is the communicating portion 26 of the second communication flow passage 23B and the reaction flow passage 20. It should be noted that pressure of the raw material fluids and the like can be measured at the respective positions such as the first extraction port 21, the second extraction port 22, the outflow port 10, and that pressure loss in each of the sections can be calculated by obtaining a difference in pressure in the respective positions, as will be explained below.

As shown in FIGS. 4A and 4B, by means of the first communication flow passage 23A and the second communication flow passage 23B, the reaction flow passage 20 from the position A to the position B is partitioned into three sections. It is assumed that a section from the position A to the position B is a section A-B, a section from the position A to the position C1 is a section A-C1, a section from the position C1 to the position C2 is a section C1-C2, and a section from the position C2 to the position B is a section C2-B. In the respective sections, if it is assumed that pressure losses of the respective sections, when the reaction flow passage 20 is not clogged (at the time of manufacture), are $\Delta P1$, $\Delta P2$, $\Delta P3$, and $\Delta P4$, the change in pressure losses of the respective sections between at the time of manufacture and after operation is as described in the "Pressure loss at the time of manufacture and after operation" column shown in Table 1.

TABLE 1

| Pressure loss at the time of manufacture | Pressure loss at the time of manufacture and after operation | In the event of blockage |
| --- | --- | --- |
| Section A-B = $\Delta P1$ | Section A-B = $\Delta P1$ <= $\Delta P1'$ | Section A-B = $\Delta P1$ < $\Delta P1'$ |
| Section A-C1 = $\Delta P2$ | Section A-C1 = $\Delta P2$ <= $\Delta P2'$ | Section A-C1 = $\Delta P2$ = $\Delta P2'$ |
| Section C1-C2 = $\Delta P3$ | Section C1-C2 = $\Delta P3$ <= $\Delta P3'$ | Section C1-C2 = $\Delta P3$ < $\Delta P3'$ |
| Section C2-B = $\Delta P4$ | Section C2-B = $\Delta P4$ <= $\Delta P4'$ | Section C2-B = $\Delta P4$ = $\Delta P4'$ |

As shown in Table 1, when the raw material fluid is passed through the reaction flow passage 20, it is assumed that pressures of the respective sections are changed as described in the "In the event of blockage" column. Since the pressure loss of the section A-C1 and the pressure loss of the section C2-B are the same value (ΔP2=ΔP2', ΔP4=ΔP4') before and after operation, it is believed that the raw material fluid flows smoothly. On the other hand, since the pressure loss of the section C1-C2 located between the section A-C1 and the section C2-B is changed and increased (ΔP3<ΔP3'), the section C1-C2 may be clogged.

As thus described, according to the present invention, the reaction flow passage 20 is partitioned into a plurality of sections by means of the communication flow passage 23, and raw material fluids are passed through the reaction flow passage 20 while measuring pressure of the raw material fluids flowing through the respective sections to determine blockage of the sections based on the pressure loss of the respective sections. When the section is determined to be blocked from the pressure loss of the respective sections, for example, when the section C1-C2 is clogged as described above, portions other than the section C1-C2 (portions other than the clogged portion) are closed by blocking tools 27 such as valves as shown in FIG. 4(b), and a cleaning liquid is passed through the section (the section C1-C2) determined to be blocked for cleaning the section C1-C2.

Specifically, the cleaning liquid is introduced from one of the first extraction port 21 and the second extraction port 22 through which pressure of the raw material fluid was extracted, and the cleaning liquid is passed through the reaction flow passage 20 in the section C1-C2 via the first communication flow passage 23A and the second communication flow passage 23B. Then, the cleaning liquid is discharged from the other of the first extraction port 21 and the second extraction port 22 opposite to the port from which the cleaning liquid is introduced, thereby cleaning the inside of the reaction flow passage 20 in the section C1-C2. That is, in the present invention, the communication flow passage 23 for extracting pressure of the raw material fluid is also used as a flow passage through which the cleaning liquid is passed when the section of the reaction flow passage 20 is blocked.

Figure 5:
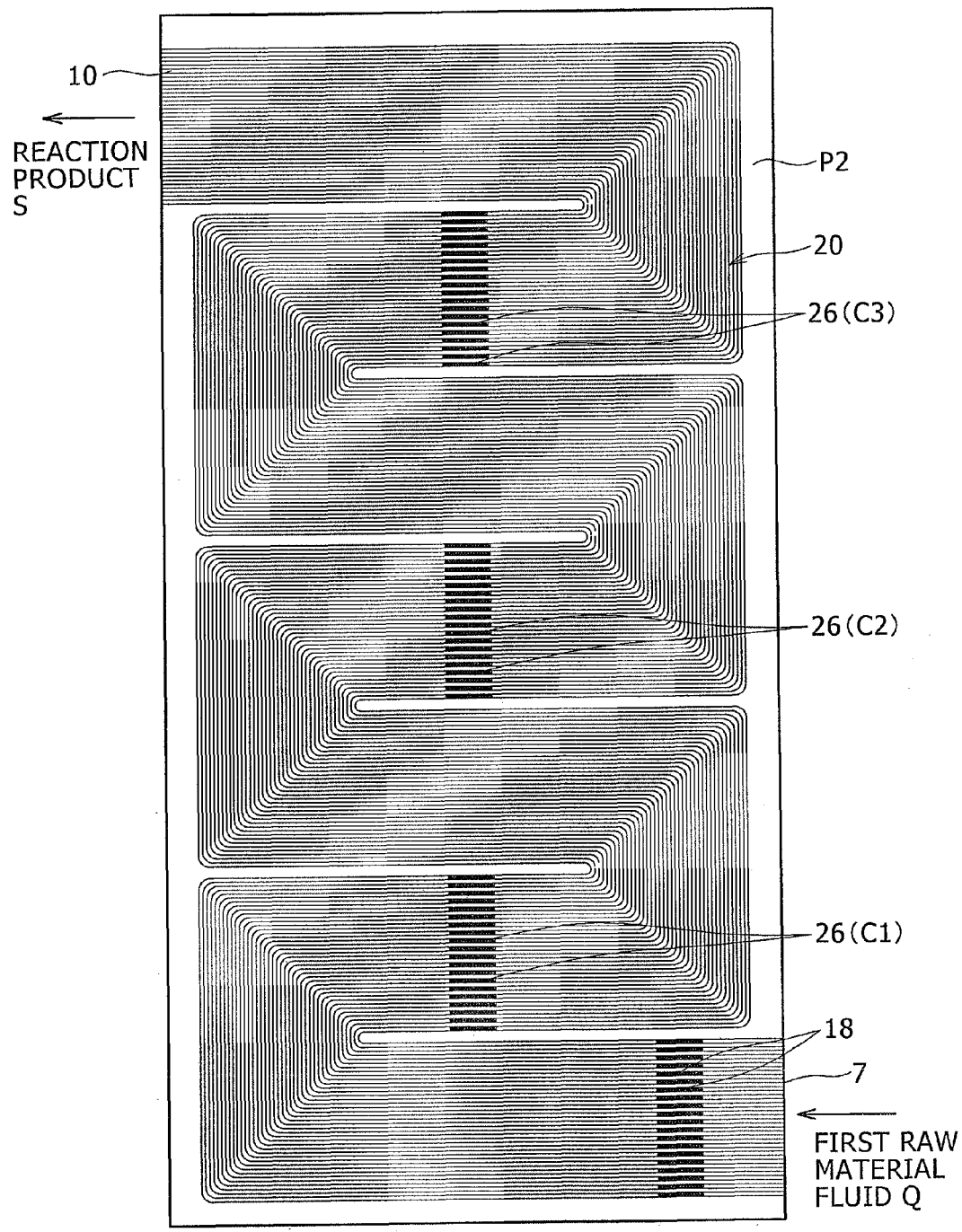
FIG. 5 is an enlarged view of the surface of the flow passage plate used in the multi-flow passage device of the present embodiment.

FIG. 5 shows an example of the actual flow passage plate (the middle flow passage plate "P2") including the above flow passage configuration. As shown in the figure, the actual flow passage plate is provided with a plurality of reaction flow passages 20, and the flow passage has a lot of bends (a lot of zig-zag bends). The length of the flow passage of the reaction flow passage 20 is very long.

As shown in FIG. 5, in the middle flow passage plate "P2", three communicating portions 26 per one reaction flow passage 20 are provided corresponding to the respective reaction flow passages 20. Then, the communication flow passages 23 are provided in the respective communicating portions 26 for partitioning the reaction flow passage 20 into four sections.

Figure 6A:
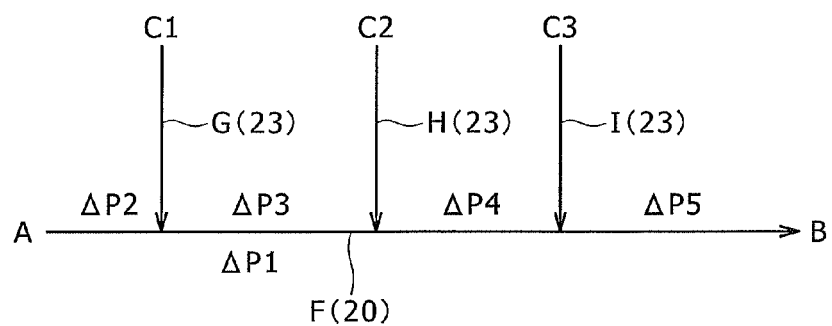
FIGS. 6A and 6B are views showing a relationship between the reaction flow passage and the communication flow passages with respect to the multi-flow passage device shown in FIG. 5.
Figure 6B:
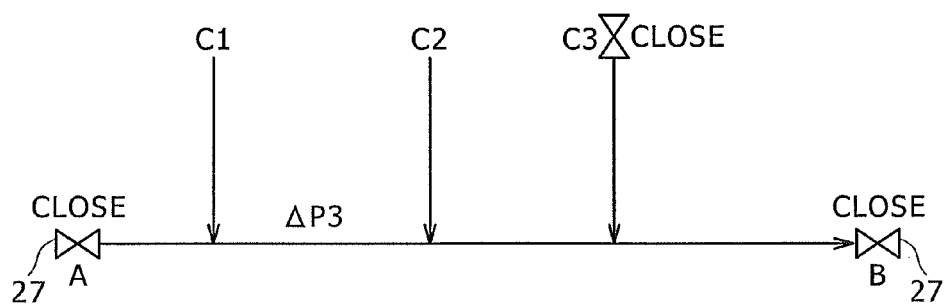

FIGS. 6A and 6B are views showing a relationship between the reaction flow passage 20 and the communication flow passages 23 in a case where the micro-channel reactor 3 is formed by means of the flow passage plate shown in FIG. 5. Since the definition of the respective sections and the definition of the pressure loss are the same as FIGS. 4A and 4B, description thereof will be omitted. Table 2 shows the change in pressure loss of the respective sections between at the time of manufacture and after operation, at the time when the micro-channel reactor 3 shown in FIG. 5 is used.

TABLE 2

| Pressure loss at the time of manufacture | Pressure loss at the time of manufacture and after operation | In the event of blockage |
| --- | --- | --- |
| Section A-B = ΔP1 | Section A-B = ΔP1 <= ΔP1' | Section A-B = ΔP1 < ΔP1' |
| Section A-C1 = ΔP2 | Section A-C1 = ΔP2 <= ΔP2' | Section A-C1 = ΔP2 = ΔP2' |
| Section C1-C2 = ΔP3 | Section C1-C2 = ΔP3 <= ΔP3' | Section C1-C2 = ΔP3 < ΔP3' |
| Section C2-C3 = ΔP4 | Section C2-C3 = ΔP4 <= ΔP4' | Section C2-C3 = ΔP4 = ΔP4' |
| Section C3-B = ΔP5 | Section C3-B = ΔP5 <= ΔP5' | Section C3-B = ΔP5 = ΔP5' |

As shown in Table 2, it is assumed that pressures of the respective sections are changed as described in the "In the event of blockage" column. Here, since the pressure loss of the section A-C1, the pressure loss of the section C2-C3, and the pressure loss of the section C3-B are the same value (ΔP2=ΔP2', ΔP4=ΔP4', ΔP5=ΔP5') before and after operation, it is believed that the raw material fluid flows smoothly. On the other hand, since the pressure loss of the section C1-C2 located between the section A-C1 and the section C2-C3 is changed and increased (ΔP3<ΔP3'), the section C1-C2 may be clogged.

Thus, when the section C1-C2 is clogged, as shown in FIG. 6B, the position A, the position C, and the position C1 are closed by the blocking tools 27. Then, for example, the cleaning liquid is introduced from the first extraction port 21, and the cleaning liquid is passed through the reaction flow passage 20 in the section C1-C2 via the first communication flow passage 23A and the second communication flow passage 23B. Then, the cleaning liquid is discharged from the extraction port opposite to the port from which the cleaning liquid is introduced, thereby cleaning the inside of the reaction flow passage 20 in the section C1-C2. Whether the clogging (blockage) within the reaction flow passage 20 in the section C1-C2 is resolved or not can be determined from the pressure loss at the time when a fluid such as a cleaning liquid is passed through the section C1-C2. For example, if the pressure loss of the fluid flowing through the section C1-C2 is lower than Δ3 at the time of manufacture or the pressure loss during operation (there is no difference between the pressure in the position C1 and the pressure in the position C2), it is determined that the clogging is resolved.

Figure 7A:
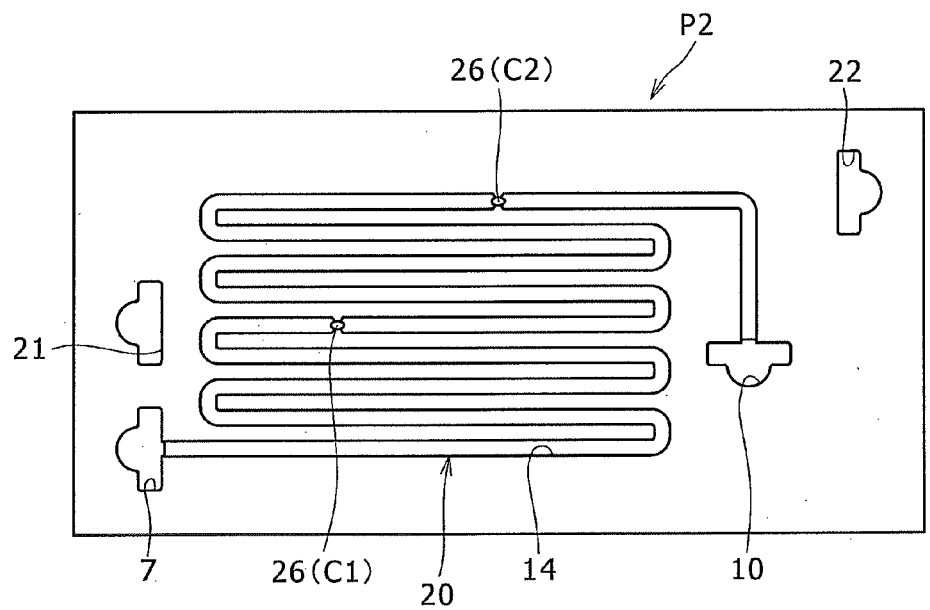
FIGS. 7A and 7B are views of a modification example of the multi-flow passage device.
Figure 7B:
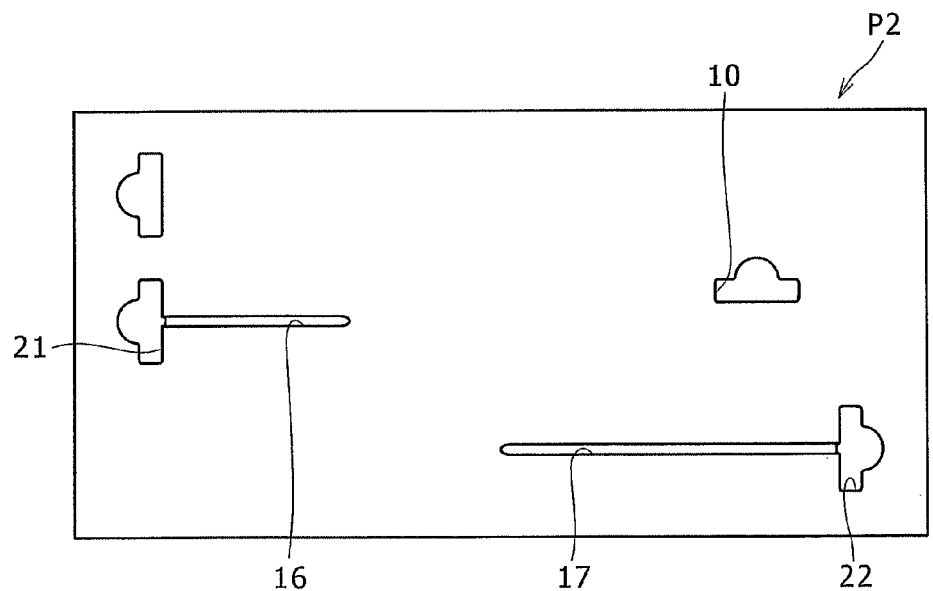

FIGS. 7A and 7B show a modification example of the multi-flow passage device, that is, a modification example of the middle flow passage plate "P2". FIG. 7A shows the upper surface (front surface) of the flow passage plate "P2", and FIG. 7B shows the lower surface (rear surface) of the flow passage plate "P2".

As shown in FIGS. 7A and 7B, at both sides of the width direction (the horizontal direction on the paper) of the middle flow passage plate "P2", a plurality of holes passing through the flow passage plate "P2" are formed. Among the plurality of holes formed at both sides of the width direction, one hole is the inflow port 7 for supplying the raw material fluid into the micro-channel reactor 3 (the reaction flow passage 20), and another hole is the outflow port 10 for discharging the raw material fluid from the reaction flow passage 20. In addition, other holes different from the inflow port 7 and the outflow port 10 are the first extraction port 21 and the second extraction port 22 for extracting pressure of the fluid within the reaction flow passage 20.

As shown in FIG. 7A, on the upper surface of the middle flow passage plate "P2", one long first flow passage groove 14 is formed in a concave shape downwardly, and the entrance side of the first flow passage groove 14 reaches the inflow port 7 and the exit side of the first flow passage groove 14 reaches the outflow port 10. The one long first flow passage groove 14 extends in the horizontal direction and is formed into a meandering shape by repeatedly turning back from the horizontal ends. On the other hand, on the lower surface of the flow passage plate "P2", the concave-shaped third flow passage groove 16 extending in the width direction from the first extraction port 21 is formed, and the exit side of the third flow passage groove 16 (the opposite side to the first extraction port 21) passes through the flow passage plate "P2" and is connected to the first flow passage groove 14 at the communicating portion 26 formed on the upper surface of the flow passage plate "P2". In addition, on the lower surface of the flow passage plate "P2", the concave-shaped fourth flow passage groove 17 extending in the width direction from the second extraction port 22 is formed, and the exit side of the fourth flow passage groove 17 (the opposite side to the second extraction port 22) passes through the flow passage plate "P2" and is connected to the first flow passage groove 14 at the communicating portion 26 formed on the upper surface of the flow passage plate "P2". In this manner, in the multi-flow passage device (the flow passage plate "P2") of the modification example, one reaction flow passage is partitioned into three sections by means of the third flow passage groove 16 and the fourth flow passage groove 17, thereby pressure of the raw material fluid flowing through the respective sections can be extracted.

As thus described, according to the present invention, by means of the communication flow passages 23, the reaction flow passage 20 is partitioned into a plurality of sections at the communicating portion, and pressure of the raw material fluid introduced from the communicating portion is measured. Therefore, the pressure loss of the raw material fluid for each section can be readily obtained, and the blocking position in the reaction flow passage 20 can be readily detected (specified). In addition, if the section is determined to be blocked from the pressure loss of the respective sections, only the section determined to be blocked can be readily cleaned.

It should be considered that the embodiments disclosed herein are exemplary and not restrictive in all respects. Specifically, in the embodiments disclosed herein, the matters not explicitly disclosed, such as the running condition and the operating condition, the various parameters, the dimension, weight, volume of the components and the like, do not depart from the scope ordinarily implemented by those of skill in the art, and the values that can be readily contemplated by those of ordinary skill in the art are adopted.

For example, in the above-mentioned embodiments, the micro-channel reactor 3 which obtains the reaction product S with the use of chemical reactions is illustrated as a multi-flow passage device. However, the multi-flow passage device of the present invention can be used as a heat exchanger for heating and cooling a target fluid, particularly a heat exchanger requiring precise control of transfer of heat, and the like.

In addition, in the above-mentioned embodiments, the communication flow passage 23 is used as a flow passage for extracting pressure of the raw material fluid flowing through the reaction flow passage 20, but it may be also used as a flow passage through which other raw material fluids are passed, in a case where pressure of the raw material fluid is not measured, and the like. In addition, in the above-mentioned embodiments, pressure of the raw material fluid flowing through the sections of the reaction flow passage 20 is measured for determining blockage of the sections based on the pressure loss of the respective sections, but pressure measurement may be performed for the raw material fluids or may be performed for the reaction product after reaction.

What is claimed is:

1. An operation method of a multi-flow passage device formed with a reaction flow passage for producing a reaction product by allowing raw material fluids to flow and making a chemical reaction, the method comprising steps of:
    partitioning the reaction flow passage into a plurality of sections; and
    allowing the raw material fluids to flow in the reaction flow passage and measuring pressure of the raw material fluids or the reaction product flowing through the respective sections to determine blockage of the sections based on the pressure loss of the respective sections,
    wherein at least one communication flow passage in communication with the reaction flow passage is provided, and the communication flow passage partitions the reaction flow passage into the plurality of sections at the communicating portion and measures pressure of the raw material fluids or the reaction product at the communicating portion, and
    the communication flow passage is also used as a flow passage through which a cleaning liquid is passed when the section of the reaction flow passage is blocked.

2. The operation method of the multi-flow passage device according to claim 1, wherein the communication flow passage is also used as a flow passage through which other raw material fluids are passed.

3. A multi-flow passage device formed with a reaction flow passage for producing a reaction product by allowing raw material fluids to flow and making a chemical reaction, wherein
    the reaction flow passage includes an inflow port through which the raw material fluids flow in and an outflow port through which the reaction product flows out, and
    between the inflow port and the outflow port of the reaction flow passage, at least one communication flow passage in communication with the reaction flow passage is provided, the communication flow passage partitioning the reaction flow passage into a plurality of sections at the communicating portion and measuring pressure of the raw material fluids or the reaction product at the communicating portion;
    wherein at least one communication flow passage in communication with the reaction flow passage is provided, and the communication flow passage partitions the reaction flow passage into the plurality of sections at the communicating portion and measures pressure of the raw material fluids or the reaction product at the communicating portion, and
    the communication flow passage is also used as a flow passage through which a cleaning liquid is passed when the section of the reaction flow passage is blocked.

4. The multi-flow passage device formed according to claim 3, wherein a cross section of an entire length of the reaction flow passage between the inflow port and the outflow port is uniform.

5. The multi-flow passage device formed according to claim 3, wherein an entire length of the reaction flow passage between the inflow port and the outflow port is groove formed on a surface of a flow passage plate.

* * * * *